(12) United States Patent
Amiri et al.

(10) Patent No.: US 11,474,192 B1
(45) Date of Patent: Oct. 18, 2022

(54) REPORTING POTENTIAL VIRTUAL ANCHOR LOCATIONS FOR IMPROVED POSITIONING

(71) Applicant: QUALCOMM Incorporated, San Diego, CA (US)

(72) Inventors: Roohollah Amiri, San Diego, CA (US); Srinivas Yerramalli, Hyderabad (IN); Rajat Prakash, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/374,663

(22) Filed: Jul. 13, 2021

(51) Int. Cl.
*G01S 5/06* (2006.01)

(52) U.S. Cl.
CPC .................. *G01S 5/06* (2013.01)

(58) Field of Classification Search
CPC ........................................... G01S 5/06
See application file for complete search history.

(56) References Cited

U.S. PATENT DOCUMENTS

2013/0222185 A1* 8/2013 Ben Hamida ............. G01S 5/14
342/387

* cited by examiner

*Primary Examiner* — Curtis B Odom
(74) *Attorney, Agent, or Firm* — Satheesh Karra

(57) ABSTRACT

Disclosed are techniques for positioning. In an aspect, a positioning entity determines a first time of flight (ToF) of a first non-line-of-sight (NLOS) multipath component of a first radio frequency (RF) signal transmitted by a physical transmission-reception point (TRP) to at least a first user equipment (UE), determines a location of a virtual TRP associated with the physical TRP based at least on the first ToF, and determines a location of at least a second UE based, at least in part, on the location of the virtual TRP.

30 Claims, 20 Drawing Sheets

```
NR-DL-TDOA-MeasElement-r16 ::= SEQUENCE {
    dl-PRS-ID-r16                      INTEGER (0..255),
    nr-PhysCellID-r16                  NR-PhysCellID-r16              OPTIONAL,
    nr-CellGlobalID-r16                NCGI-r15                       OPTIONAL,
    nr-ARFCN-r16                       ARFCN-ValueNR-r15              OPTIONAL,
    nr-DL-PRS-ResourceID-r16           NR-DL-PRS-ResourceID-r16       OPTIONAL,
    nr-DL-PRS-ResourceSetID-r16        NR-DL-PRS-ResourceSetID-r16    OPTIONAL,
    nr-TimeStamp-r16                   NR-TimeStamp-r16,
    nr-RSTD-r16                        CHOICE {
        k0-r16                             INTEGER (0..1970049),
        k1-r16                             INTEGER (0..985025),
        k2-r16                             INTEGER (0..492513),
        k3-r16                             INTEGER (0..246257),
        k4-r16                             INTEGER (0..123129),
        k5-r16                             INTEGER (0..61565),
    ...
},  nr-AdditionalPathList-r16          NR-AdditionalPathList-r16      OPTIONAL,
    nr-TimingQuality-r16               NR-TimingQuality-r16,
    nr-DL-PRS-RSRP-Result-r16          INTEGER (0..126)               OPTIONAL,
    nr-DL-TDOA-AdditionalMeasurements-r16  NR-DL-TDOA-AdditionalMeasurements-r16  OPTIONAL,
...
```

```
NR-AdditionalPathList-r16 ::= SEQUENCE (SIZE(1..2)) OF NR-AdditionalPath-r16

NR-AdditionalPath-r16 ::= SEQUENCE {
    nr-RelativeTimeDifference-r16    CHOICE {
        k0-r16                           INTEGER(0..16351),
        k1-r16                           INTEGER(0..8176),
        k2-r16                           INTEGER(0..4088),
        k3-r16                           INTEGER(0..2044),
        k4-r16                           INTEGER(0..1022),
        k5-r16                           INTEGER(0..511),
        ...
    },
    nr-PathQuality-r16               NR-TimingQuality-r16                OPTIONAL,
    ...
}
```

```
TRP-LocationInfoElement-r16 ::= SEQUENCE {
    dl-PRS-ID-r16                   INTEGER (0..255),
    nr-PhysCellID-r16               NR-PhysCellID-r16           OPTIONAL,
    nr-CellGlobalID-r16             NCGI-r15                    OPTIONAL,
    nr-ARFCN-r16                    ARFCN-ValueNR-r15           OPTIONAL,
    associated-DL-PRS-ID-r16        INTEGER (0..255)            OPTIONAL,
    trp-Location-r16                RelativeLocation-r16        OPTIONAL,
    virtual-trp-location            RelativeLocation-r16
    virtual-trp-uncertainty         LocationUncertaintyReport
    trp-DL-PRS-ResourceSets-r16     SEQUENCE (SIZE(1..nrMaxSetsPerTrp-r16)) OF
                                        DL-PRS-ResourceSets-TRP-Element-r16     OPTIONAL,
    ...
}
```

REPORTING POTENTIAL VIRTUAL ANCHOR LOCATIONS FOR IMPROVED POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of positioning performed by a positioning entity includes determining a first time of flight (ToF) of a first non-line-of-sight (NLOS) multipath component of a first radio frequency (RF) signal transmitted by a physical transmission-reception point (TRP) to at least a first user equipment (UE); determining a location of a virtual TRP associated with the physical TRP based at least on the first ToF; and determining a location of at least a second UE based, at least in part, on the location of the virtual TRP.

In an aspect, a positioning entity includes a memory; at least one transceiver; and at least one processor communicatively coupled to the memory and the at least one transceiver, the at least one processor configured to: determine a first time of flight (ToF) of a first non-line-of-sight (NLOS) multipath component of a first radio frequency (RF) signal transmitted by a physical transmission-reception point (TRP) to at least a first user equipment (UE); determine a location of a virtual TRP associated with the physical TRP based at least on the first ToF; and determine a location of at least a second UE based, at least in part, on the location of the virtual TRP.

In an aspect, a positioning entity includes means for determining a first time of flight (ToF) of a first non-line-of-sight (NLOS) multipath component of a first radio frequency (RF) signal transmitted by a physical transmission-reception point (TRP) to at least a first user equipment (UE); means for determining a location of a virtual TRP associated with the physical TRP based at least on the first ToF; and means for determining a location of at least a second UE based, at least in part, on the location of the virtual TRP.

In an aspect, a non-transitory computer-readable medium storing computer-executable instructions that, when executed by a positioning entity, cause the positioning entity to: determine a first time of flight (ToF) of a first non-line-of-sight (NLOS) multipath component of a first radio frequency (RF) signal transmitted by a physical transmission-reception point (TRP) to at least a first user equipment (UE); determine a location of a virtual TRP associated with the physical TRP based at least on the first ToF; and determine a location of at least a second UE based, at least in part, on the location of the virtual TRP.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 11 illustrates an example information element for reporting measurements, according to aspects of the disclosure.

FIG. 12 illustrates an example additional path list information element, according to aspects of the disclosure.

FIG. 13 illustrates an assistance data information element that includes the estimated location of a virtual anchor and an associated uncertainty, according to aspects of the disclosure.

DETAILED DESCRIPTION

Figure 1:
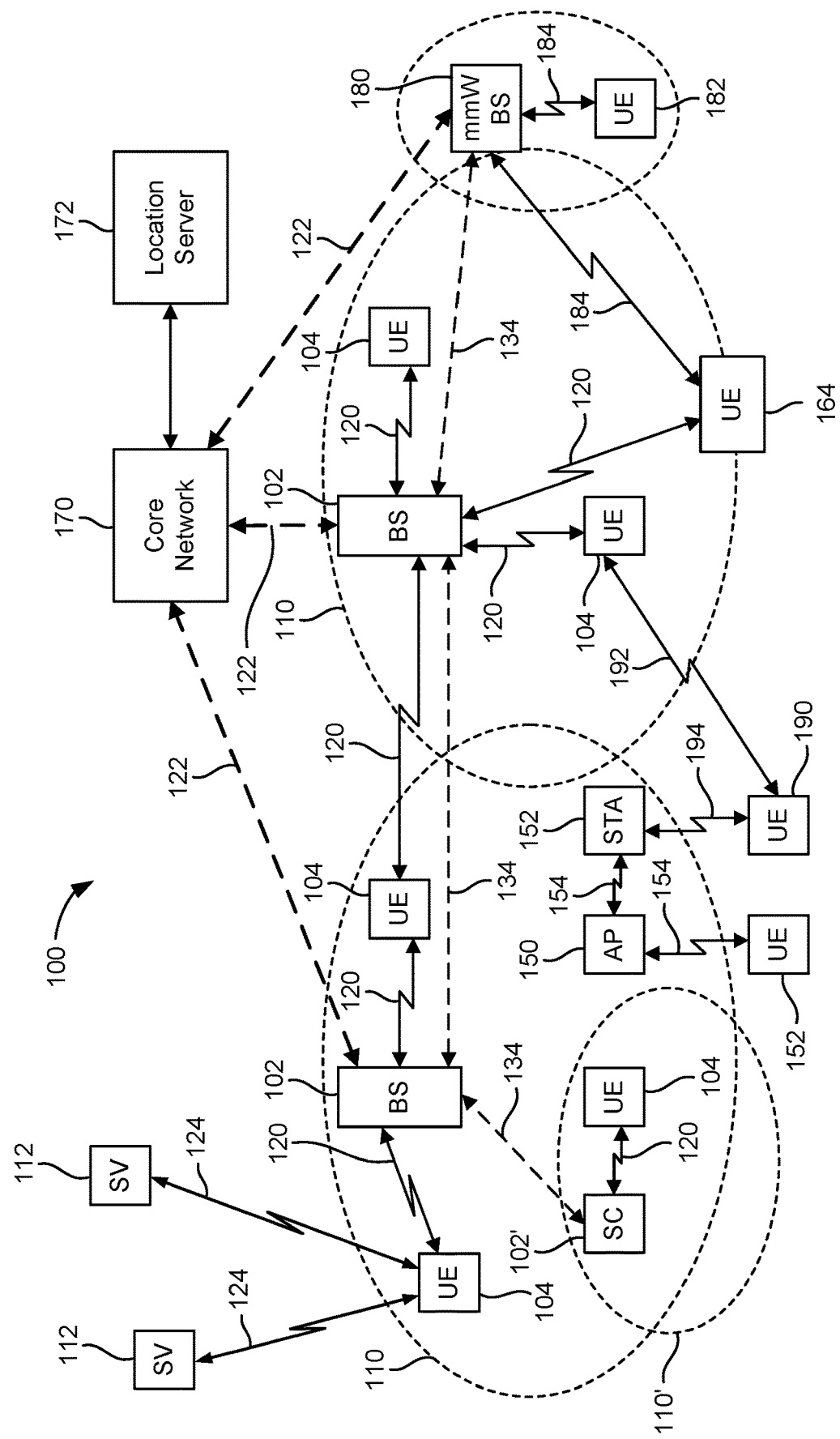
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave (or waveform) of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a SGC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
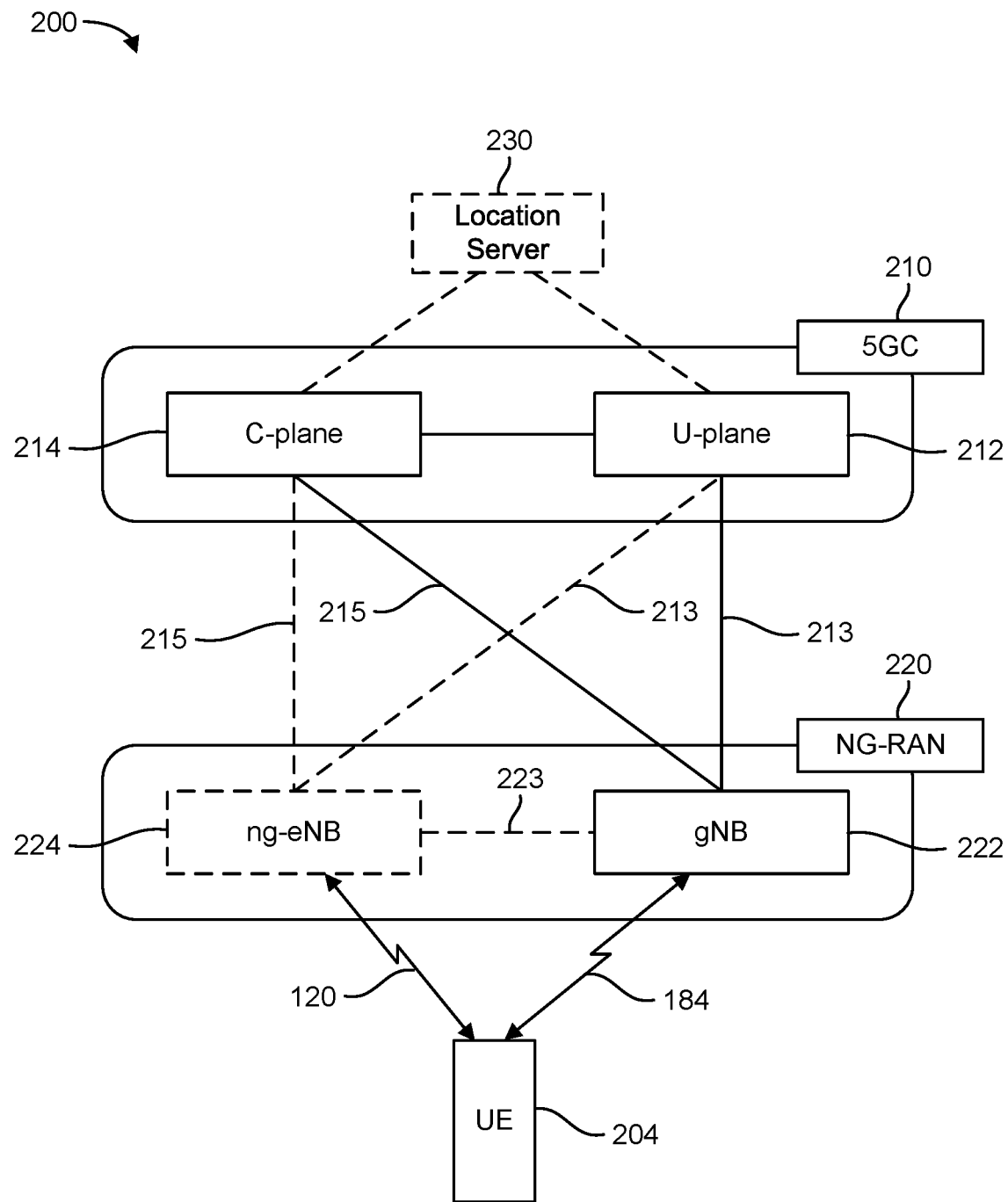
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
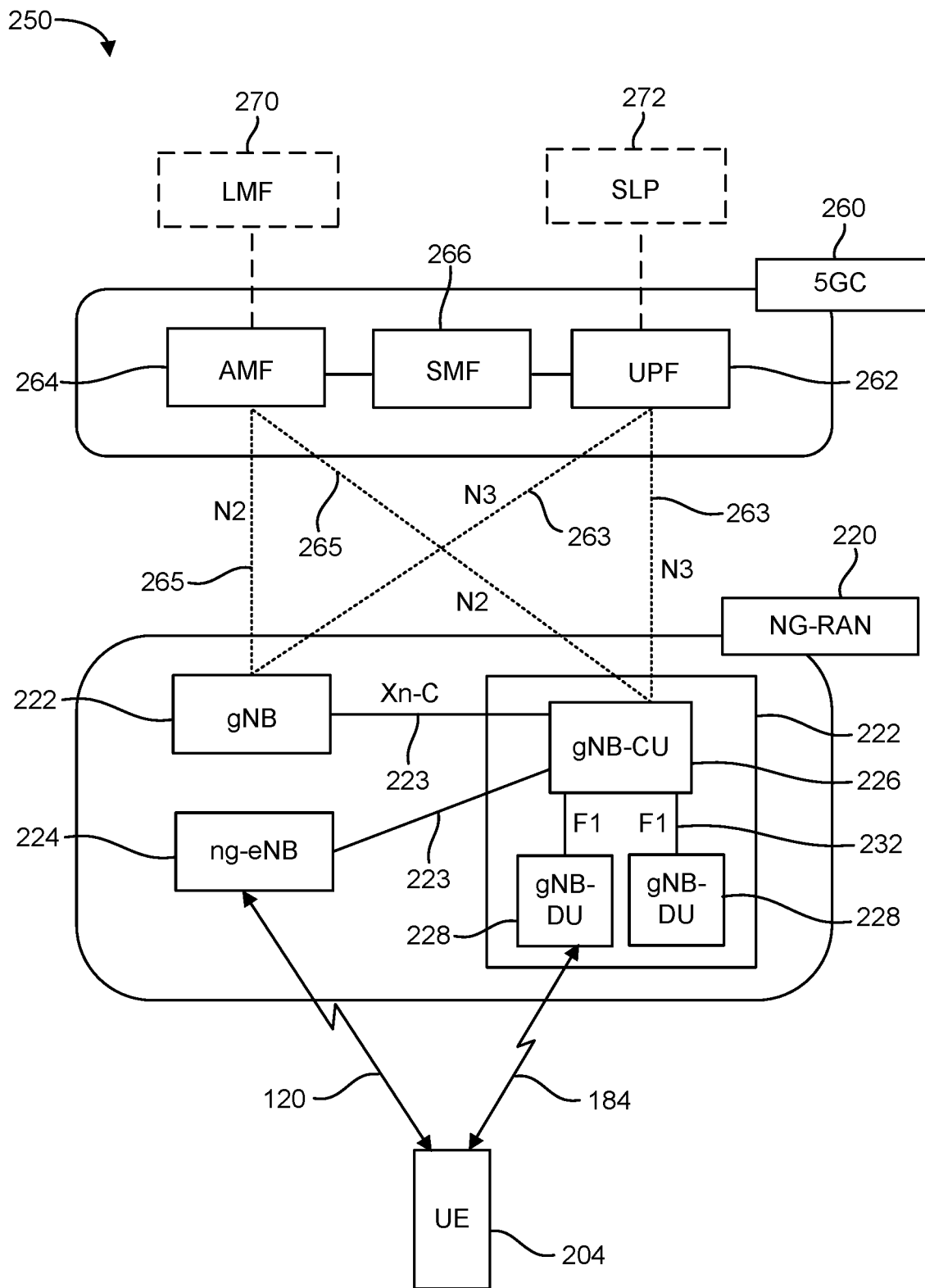

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
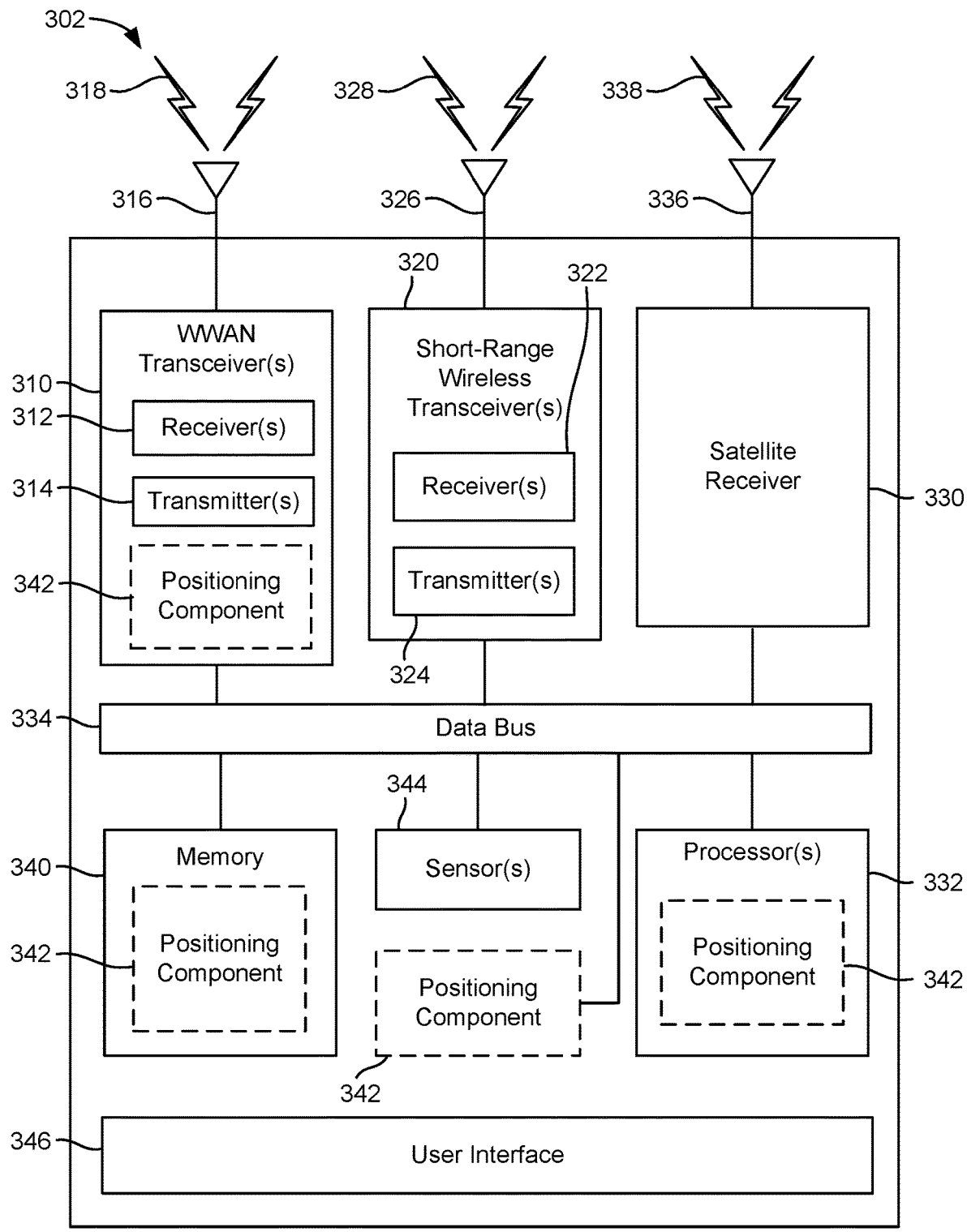
FIGS. 3A, 3B, and 3C are simplified block diagrams of several sample aspects of components that may be employed in a user equipment (UE), a base station, and a network entity, respectively, and configured to support communications as taught herein.
Figure 3B:
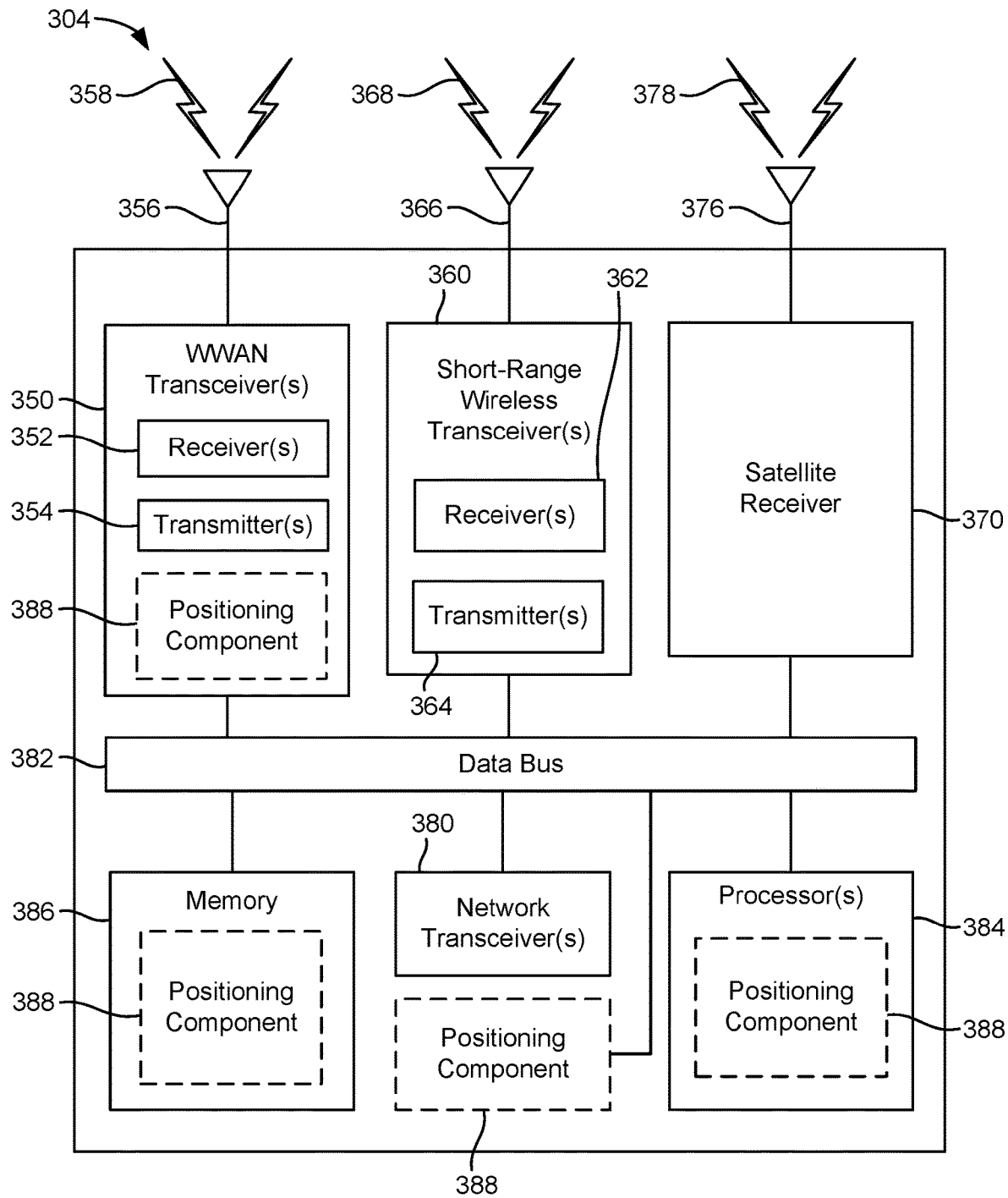
Figure 3C:
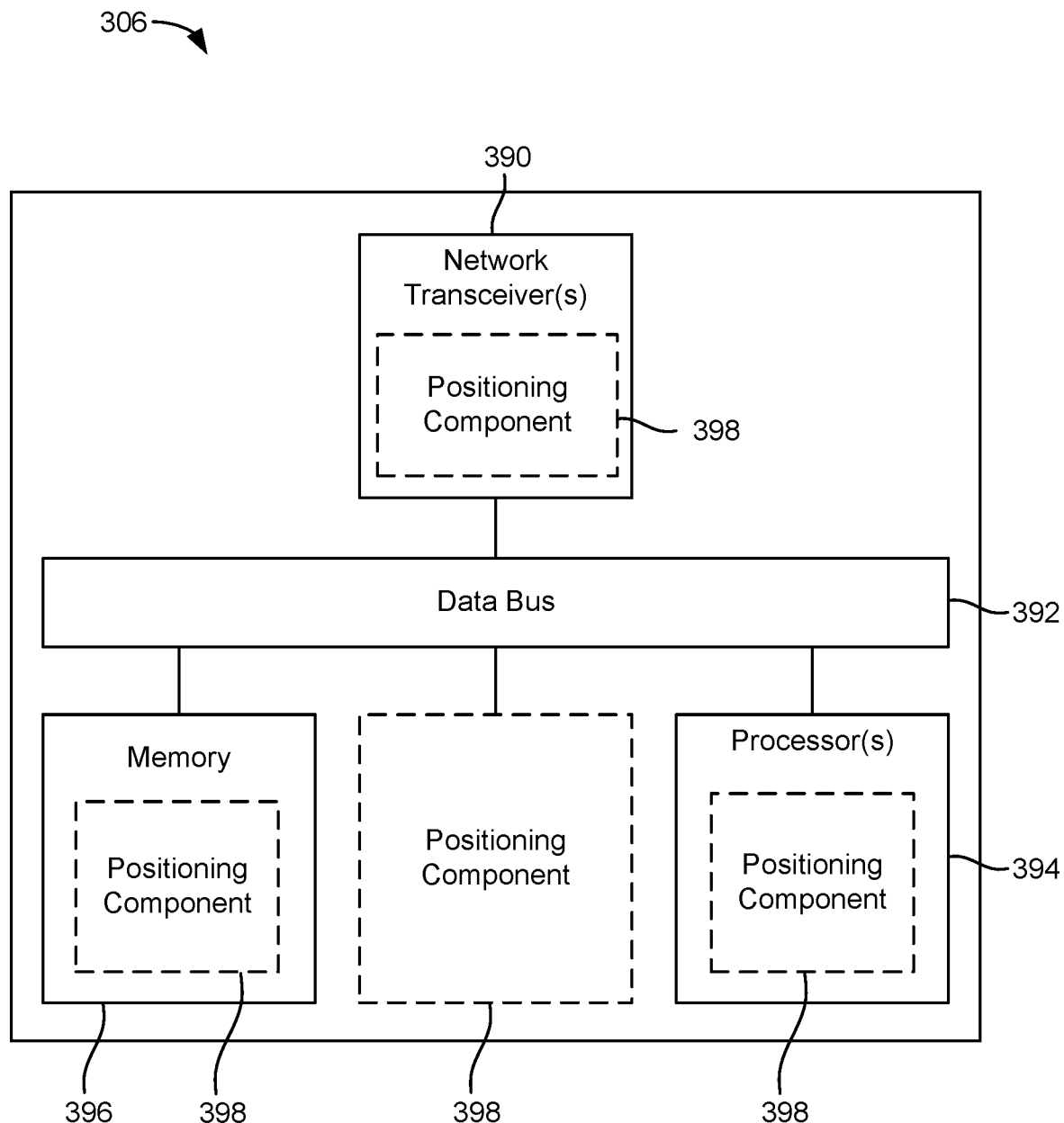

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
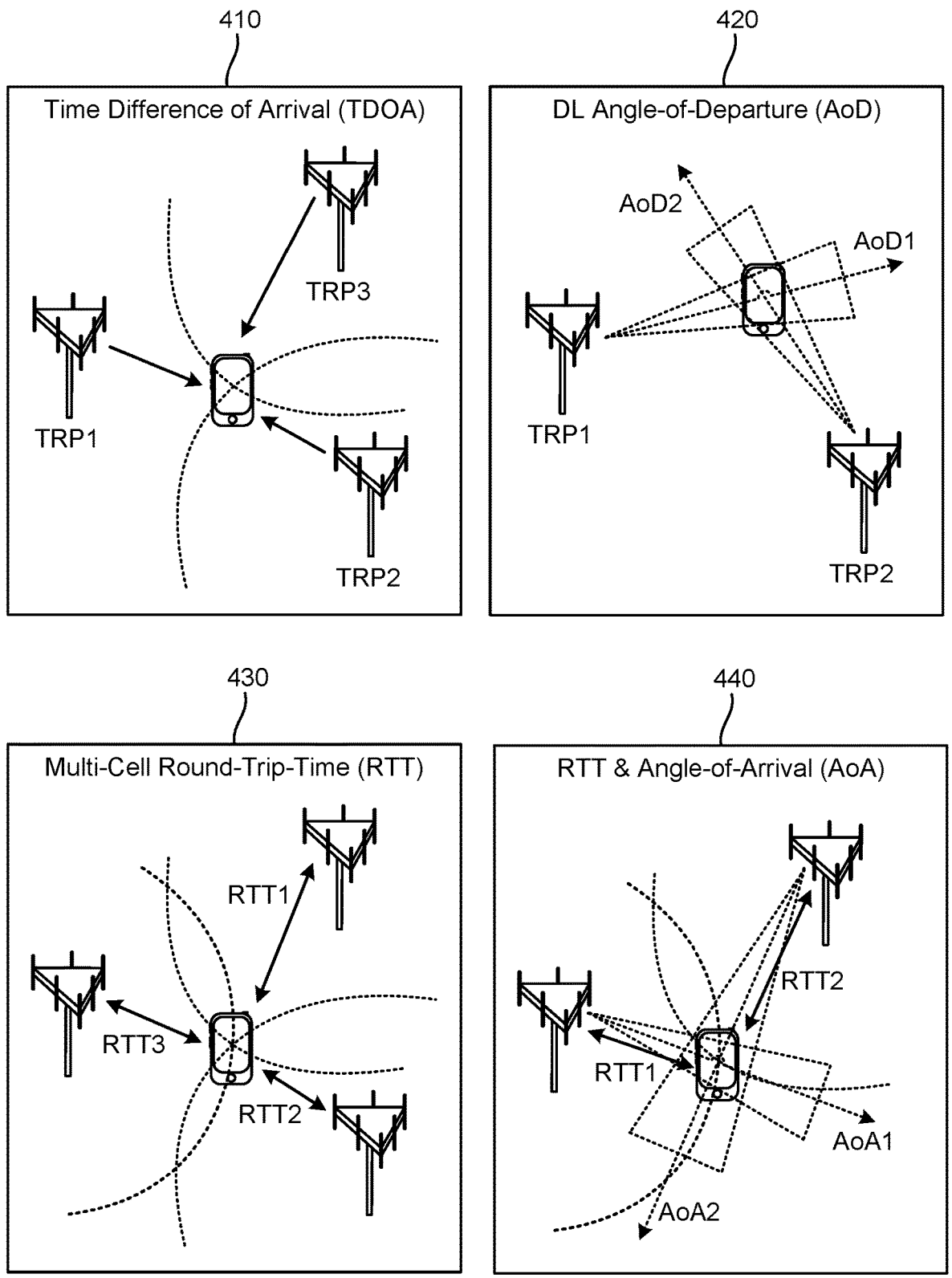
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a target UE (i.e., a UE to be positioned/located) measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, illustrated by scenario 420, the positioning entity uses a beam report from the target UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the target UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, illustrated by scenario 430, a target UE performs an RTT procedure with multiple base stations to enable its location to be determined (e.g., using multilateration) based on the known locations of the base stations. RTT and multi-RTT methods can be combined with other positioning techniques, such as UL-AoA, illustrated by scenario 440, and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the target UE is then estimated based on this information and the known locations of the base station(s).

To assist positioning operations, a location server (e.g., location server 230, LMF 270, SLP 272) may provide assistance data to the target UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
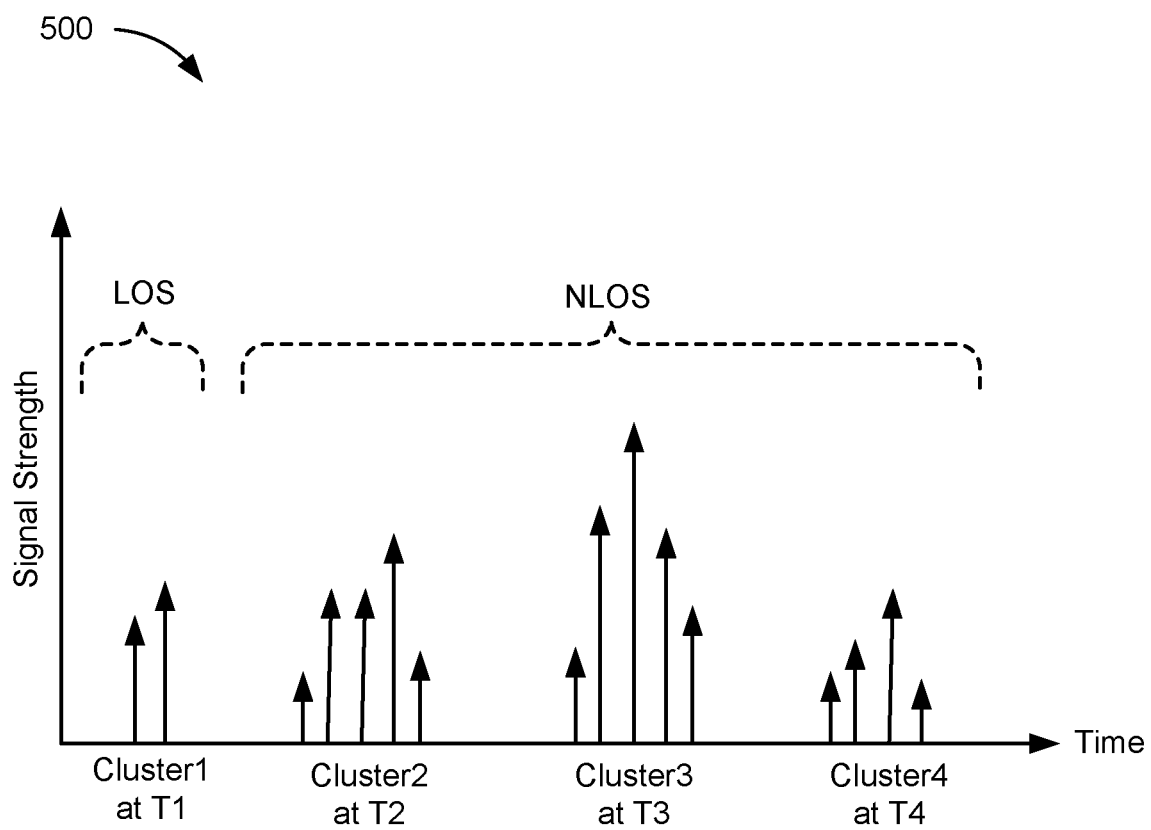
FIG. 5 is a graph representing a radio frequency (RF) channel impulse response over time, according to aspects of the disclosure.

When an electromagnetic wave hits a surface, which is much larger than the wavelength, part of the energy of the wave is reflected, part of it is absorbed by the surface, and the remainder is refracted through the surface. FIG. 5 is a graph 500 representing the channel impulse response of a multipath channel between a receiver device (e.g., any of the UEs or base stations described herein) and a transmitter device (e.g., any other of the UEs or base stations described herein), according to aspects of the disclosure. The channel impulse response represents the intensity of a radio frequency (RF) signal (i.e., an electromagnetic wave) received through a multipath channel as a function of time delay. Thus, the horizontal axis is in units of time (e.g., milliseconds) and the vertical axis is in units of signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 5, the receiver detects/measures multiple (four) clusters of channel taps. Each channel tap represents a multipath that an RF signal followed between the transmitter and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (e.g., potentially following different paths due to reflections), or both.

All of the clusters of channel taps for a given RF signal represent the multipath channel (or simply channel) between the transmitter and receiver. Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is assumed to correspond to the RF signal transmitted on the transmit beam aligned with the line-of-sight (LOS), or the shortest, multipath (or path). The third cluster at time T3 is comprised of the strongest RF signals, and may correspond to, for example, the RF signal transmitted on a transmit beam aligned with a non-line-of-sight (NLOS) path. Note that although FIG. 5 illustrates clusters of two to five channel taps, as will be appreciated, the clusters may have more or fewer than the illustrated number of channel taps.

A TRP (or UE or other device) that participates in a positioning procedure with a target UE and has a known location (at least to the positioning entity) is referred to as an "anchor" (or "anchor point" or "anchor node" or the like). A "virtual anchor" (VA) is a virtual TRP that appears to be located at a location that, with respect to a reflecting surface, is a mirror image of the location of the real, or physical, TRP/anchor. More specifically, according to the two-ray channel model (i.e., a channel having at least an LOS path and an NLOS path, as described with reference to FIG. 5), the NLOS multipath that results from reflection off a surface can be related to a virtual TRP located in a mirror position of the real TRP with respect to the reflecting surface.

Figure 6:
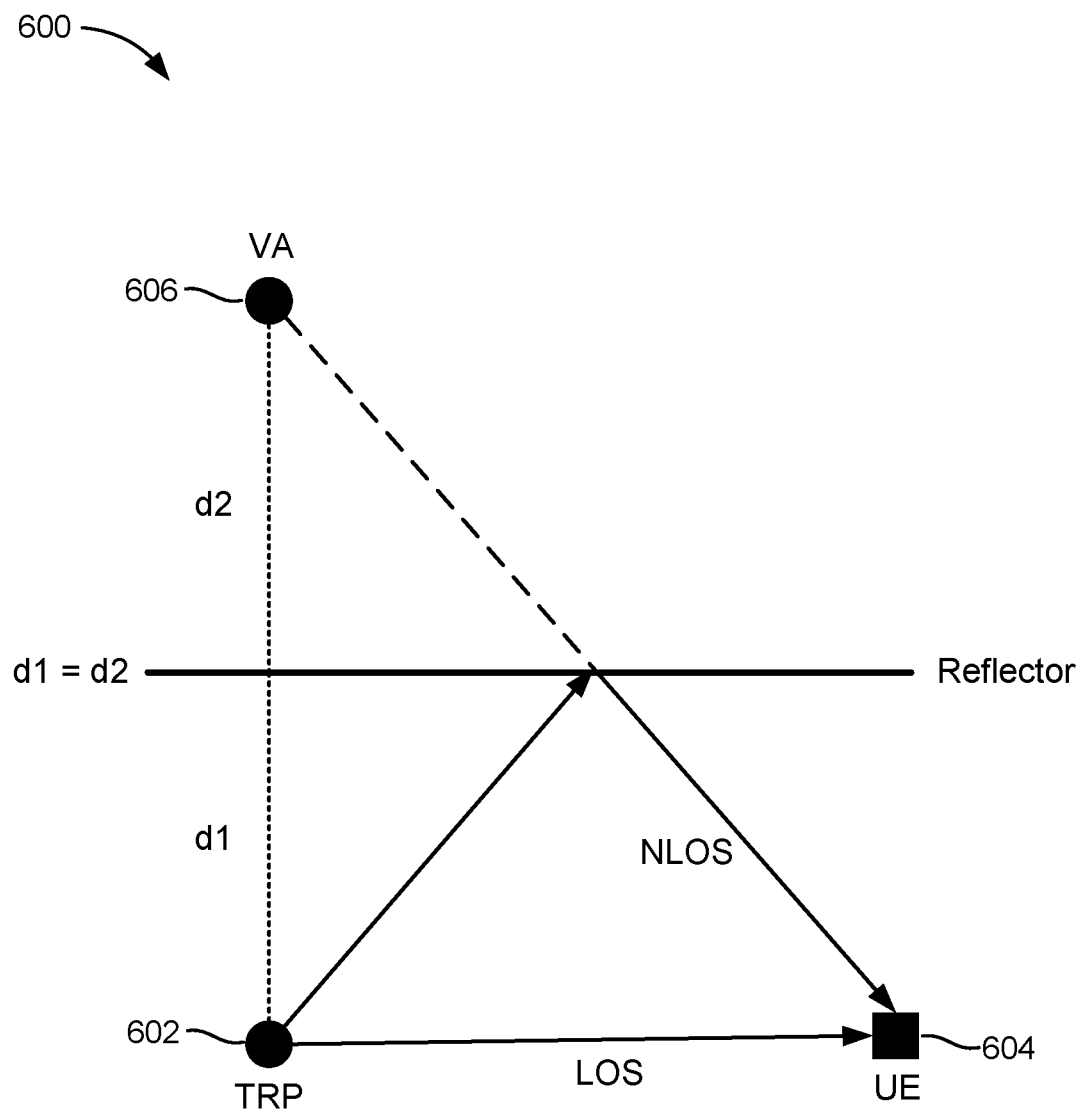
FIG. 6 is a diagram illustrating the relationship between a virtual anchor and the real anchor, according to aspects of the disclosure.

FIG. 6 is a diagram 600 illustrating the relationship between a virtual anchor and the real anchor, according to aspects of the disclosure. As shown in FIG. 6, a physical TRP 602 (e.g., a TRP of any of the base stations described herein) is transmitting an electromagnetic wave (an RF signal) towards a UE 604 (e.g., any of the UEs described herein). The TRP 602 is a distance "d1" from a reflecting surface (labeled "Reflector"). The RF signal transmitted by the TRP 602 follows an LOS path and an NLOS path to the UE 604. Thus, the RF signal has both an LOS component and an NLOS component when received at the UE 604. As shown in FIG. 6, the NLOS path appears to the UE 604 to be an LOS path from a virtual anchor (VA) 606 located a distance "d2" (equal to d1) on the other side of the reflecting surface perpendicular to the physical TRP 602. The virtual anchor 606 therefore plays the role of a node that generates the NLOS multipath component that the UE 604 observes. The time of flight (ToF) of the NLOS path equals the ToF of the RF signal from the virtual anchor 606 to the UE 604.

Figure 7:
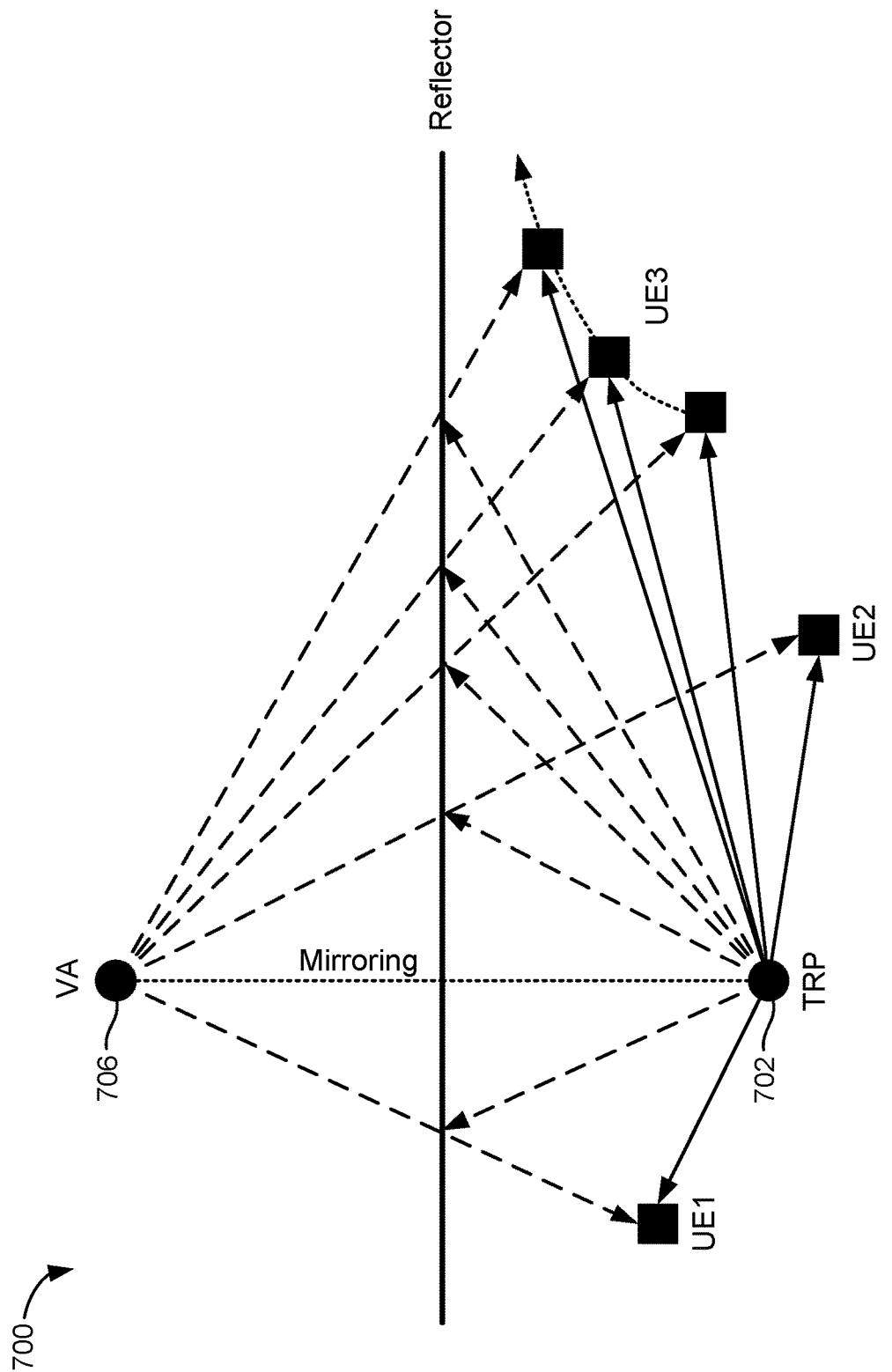
FIG. 7 is a diagram illustrating the consistency of a virtual anchor location with respect to a reflecting surface with UE mobility and multiple UEs, according to aspects of the disclosure.

FIG. 7 is a diagram 700 illustrating the consistency of a virtual anchor location with respect to a reflecting surface with UE mobility and multiple UEs, according to aspects of the disclosure. As shown in FIG. 7, a TRP 702 (e.g., a TRP of any of the base stations described herein) is transmitting RF signals to three UEs, labeled "UE1," "UE2," and "UE3" (e.g., any of the UEs described herein). The RF signals follow LOS paths (represented by solid lines) to each of the UEs. The RF signals also reflect off a reflecting surface (labeled "Reflector"), thereby following NLOS paths (represented by dashed lines) to the UEs and appearing to be generated by a virtual anchor (VA) 706. As shown in FIG. 7, for each of the UEs, even though at a different location relative to the TRP 702, the virtual anchor 706 appears to be in the same location relative to the TRP 702. In addition, even though UE3 is moving, the virtual anchor 706 does not move and instead appears to be in the same location relative to the TRP 702.

Figure 8:
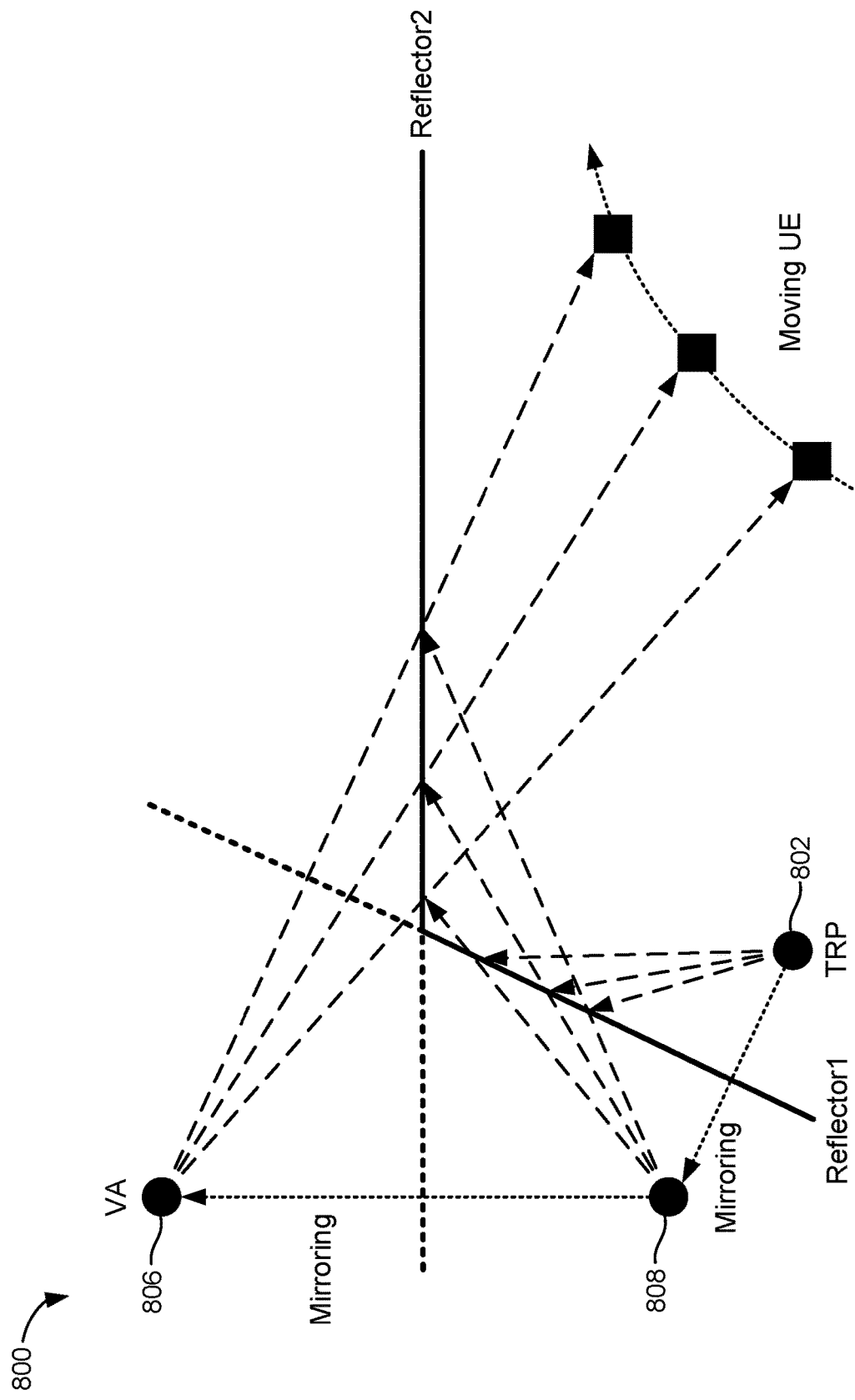
FIG. 8 is a diagram illustrating a multiple reflector scenario with a virtual anchor, according to aspects of the disclosure.

FIG. 8 is a diagram 800 illustrating a multiple reflector scenario with a virtual anchor, according to aspects of the disclosure. As shown in FIG. 8, a TRP 802 (e.g., a TRP of any of the base stations described herein) is transmitting RF signals to a moving UE (e.g., any of the UEs described herein). The RF signals reflect off a first reflecting surface (labeled "Reflector1") and a second reflecting surface (labeled "Reflector2"), thereby following NLOS paths (represented by dashed lines) to the UE and appearing to be generated by a virtual anchor (VA) 806. As shown in FIG. 8, the location of the virtual anchor 806 for a two-reflection path scenario is the mirror image of the location of the TRP 802 for the first reflecting surface (represented by point 808) and then, for the second reflecting surface, the mirror image of the location of the mirror image of the TRP 802 with respect to the first reflecting surface (i.e., the mirror image of point 808).

Figure 9:
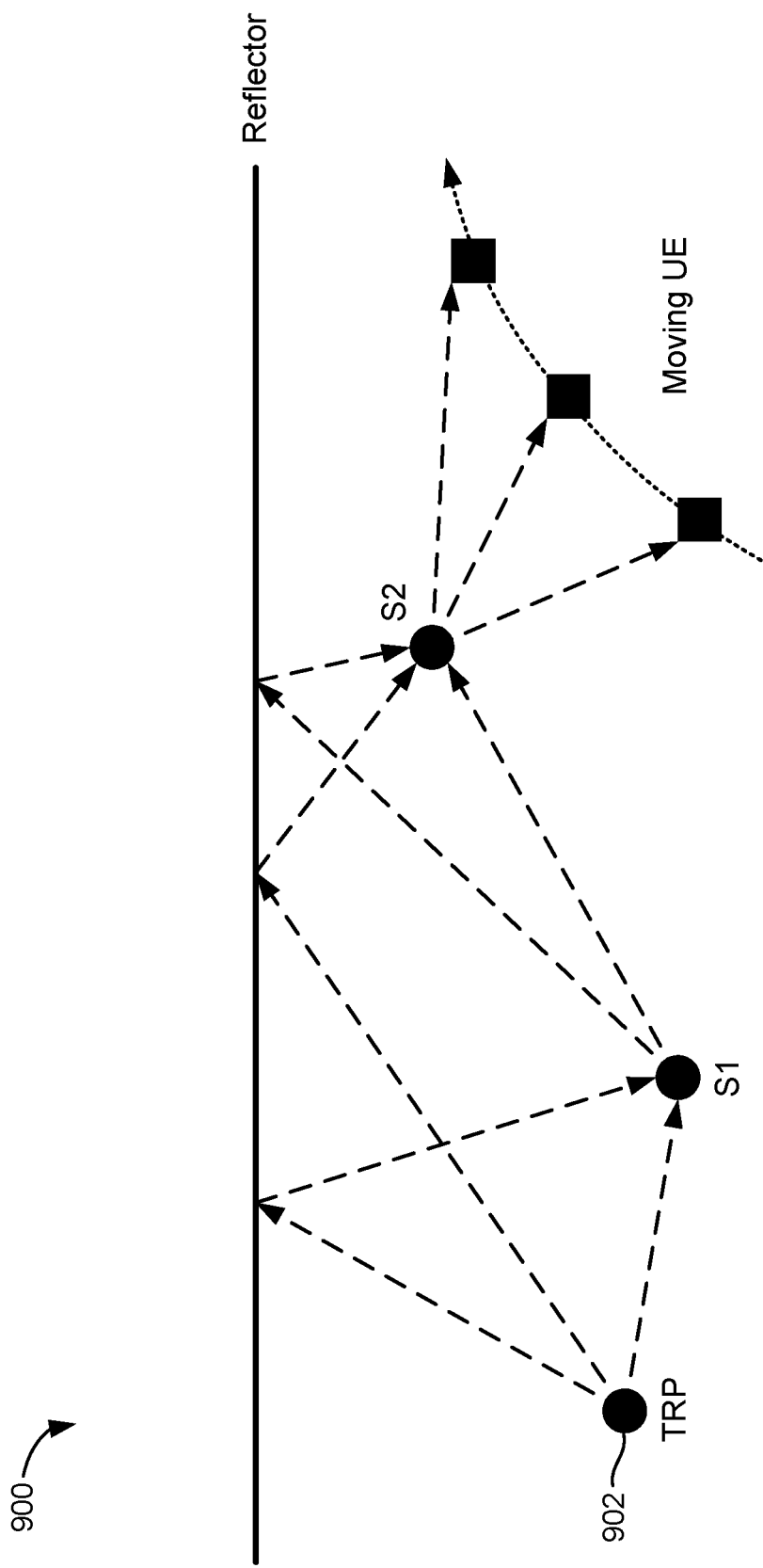
FIG. 9 is a diagram illustrating the effect of scattering entities with respect to a reflecting surface, according to aspects of the disclosure.

FIG. 9 is a diagram 900 illustrating the effect of scattering entities with respect to a reflecting surface, according to aspects of the disclosure. As shown in FIG. 9, a TRP 902 (e.g., a TRP of any of the base stations described herein) is transmitting RF signals to a moving UE (e.g., any of the UEs described herein). The RF signals reflect off a reflecting surface (labeled "Reflector") and two scattering entities (labeled "S1" and "S2"), thereby following NLOS paths (represented by dashed lines) to the UE. As shown in FIG. 9, because of the scattering caused by the scattering entities, the virtual anchor property is not preserved. The scattering entities act as new point sources of the energy of the RF signals, and the multipath propagation characteristics before reaching the scattering entities cannot be easily reconstructed.

As shown above, reflected multipath components can be readily used to improve positioning by tracking the virtual anchor locations, as illustrated in FIGS. 6 to 8. In contrast, scattered paths are much harder to utilize for positioning, as illustrated in FIG. 9.

Traditional positioning methods rely on at least three LOS measurements from TRPs to estimate the location of a UE (e.g., via trilateration/triangulation). In many environments, it is possible for TRPs to be blocked from the LOS view of a UE, resulting in an insufficient number of LOS measurements. In such cases, traditional positioning methods can fail.

A UE may determine the location of a virtual anchor by extracting multipath components of the RF signal(s) received from a TRP and tracking the virtual anchor location over time (assuming UE mobility). Depending on the UE's capability of measuring the angle of arrival (AoA) of an RF signal (or more specifically, the multipath components of an RF signal), the location of a virtual anchor can be estimated based on (1) AoA and ToF or (2) ToF-only. Once the location of the virtual anchor is determined, it can be used as an anchor for a positioning procedure (e.g., RTT, DL-TDOA, etc.).

Regarding the AoA and ToF technique, the location of a virtual anchor can be derived based on one type of measurement of the RF signal(s) received from a TRP, specifically, the AoA measurement of the NLOS component(s) of the RF signal(s). The ToF may be determined from the known transmission time(s) of the RF signal(s) (from the TRP) and the time(s) of arrival (ToA(s)), or reception time(s), at the UE. The TRP may report the transmission time(s) of the RF signal(s) to the positioning entity, which may be the UE for UE-based positioning or a location server (e.g., LMF 270) for UE-assisted positioning. For UE-assisted positioning, the UE reports the ToA(s) and AoA(s) of the NLOS component(s) of the RF signal(s) to the location server. The location of the virtual anchor is then calculated at a point that is the distance from the UE indicated by the ToF and at an angle from the UE indicated by the AoA (i.e., in the direction of the AoA).

Figure 10:
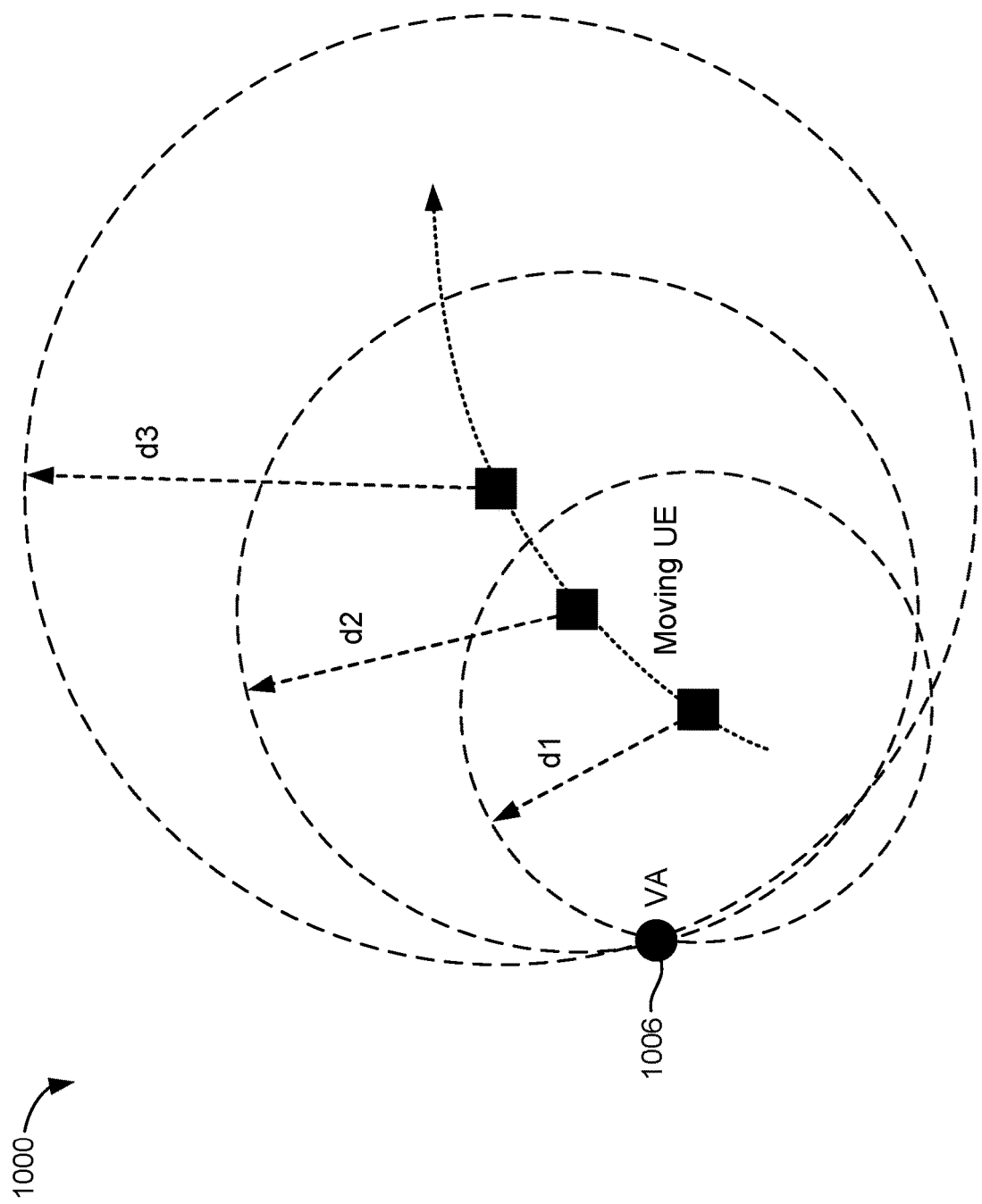
FIG. 10 is a diagram illustrating the time-of-flight (ToF)-only technique, according to aspects of the disclosure.

Regarding the ToF-only technique, the location of the virtual anchor can be derived by intersecting consecutive circles around the UE as it moves, each circle having a radius of the range to the virtual anchor determined based on the ToF of the NLOS paths. FIG. 10 is a diagram 1000 illustrating the ToF-only technique, according to aspects of the disclosure. As shown in FIG. 10, a UE (e.g., any of the UEs described herein) is in a motion state (e.g., walking, driving, biking, etc.). At different locations, the UE measures the ToA of the NLOS component of an RF signal from a TRP (not shown). Based on the transmission times of the RF signals and the measured ToAs, the positioning entity (either the UE or location server) can calculate the ToFs of the NLOS components of the RF signals. Based on the ToFs, the positioning entity can determine a distance, or range, to the virtual anchor (VA) 1006 at each measurement location (the distance is the ToF multiplied by the speed of light). In the example of FIG. 10, there are three measurement locations and three calculated distances, labeled "d1," "d2," and "d3." The location of the virtual anchor 1006 is estimated as the intersection of three circles around the three measurement locations, with each circle having a radius of the distance to the virtual anchor 1006 determined at that location.

Although the moving UEs in FIGS. 7 to 10 are shown as performing measurements at three different locations, as will be appreciated, a UE may perform measurements at more than three locations while in a motion state.

A UE may extract/determine multiple NLOS multipath components (e.g., as shown in FIG. 5) at each measurement location (e.g., three in the examples of FIGS. 7 to 10). However, not all NLOS components may correspond to virtual anchors. In order to ignore virtual anchors that are the result of diffracted or multiple reflection multipaths, the positioning entity can perform a consistency test to determine the consistency of a virtual anchor location. To perform a consistency test, the UE should be moving so that the ToFs are determined at different locations (and thereby during different measurement occasions). The TRP should transmit the RF signals on the same time and frequency resources in each measurement occasion so that the measurements by the UE are comparable. The positioning entity calculates the location of the virtual anchor using the ToFs, as described above with reference to FIG. 10. After a threshold number of virtual anchor location determinations, locations that are not consistent with the remaining locations (referred to as "outliers") can be removed, leaving only consistent locations. After a threshold number of consistent locations have been determined, the location of the virtual anchor is considered valid. The remaining consistent (or "inlier") locations can be combined into a single location, such as the average or median of the remaining locations.

For UE-assisted positioning procedures, as noted above, the UE reports the measured multipath delays (ToAs) and, optionally, the corresponding angles to the location server (which may be located in the core network or the RAN). More specifically, the UE reports multiple prominent peaks that may considered reflected, diffracted, or scattered paths.

Currently, a UE can report measurements of two additional paths (in addition to the measurement reported as the actual positioning measurement) when reporting measurements for positioning purposes. The measurements may be the reception times of the paths, RSTD (or relative time difference) measurements based on the paths, Rx-Tx time difference measurements based on the paths, etc. These additional path fields can be used to report measurements based on either (1) additional hypothesis for LOS delay or (2) actual multipath (second multipath or later) components that can be used to derive virtual TRP locations. Regarding the first option, the actual positioning measurement being reported (e.g., RSTD, Rx-Tx difference, ToA, etc.) would be based on the UE's primary hypothesis for the LOS delay (i.e., the UE's best estimate of which multipath is the LOS path and the reception time of that path), but the UE may report additional hypothesis for the LOS delay if the UE is not certain of the LOS delay of the reported measurement (e.g., due to a weak path).

The present disclosure proposes to allow the UE to indicate additional information (parameters) about each additional path it reports, rather than just the positioning measurement (e.g., reception time, RSTD, Rx-Tx time difference) based on that path. For example, a UE may tag an additional path field as belonging to an additional hypothesis of the LOS delay, or as a multipath, or both. The UE may also report a parameter indicating the strength of the path (e.g., SINR, RSRP). The UE may also report a parameter indicating whether the UE believes the path is a reflected path, a scattered path, a diffracted path, etc. How the UE estimates the path is a reflected path, a scattered path, a diffracted path, etc. is up to implementation, and may be based on previous observations.

FIG. 11 illustrates an example information element 1100 for reporting measurements, according to aspects of the disclosure. In the example of FIG. 11, the information element 1100 is named "NR-DL-TDOA-MeasElement-r16" and the reported measurements are RSTD measurements for a TDOA positioning procedure. However, as will be appreciated, the disclosure is not limited to TDOA positioning procedures. As shown in FIG. 11, the information element 1100 includes an additional path list field that can be used to report additional paths for a particular measurement (here, RSTD measurements). In the example of FIG. 11, the additional path list field is named "nr-AdditionalPathList-r16" and points to a "NR-AdditionalPathList-r16" information element.

FIG. 12 illustrates an example additional path list information element 1200, according to aspects of the disclosure. In the example of FIG. 12, the information element 1200 is named "NR-AdditionalPathList-r16" and may be the "NR-AdditionalPathList-r16" information element pointed to by the "nr-AdditionalPathList-r16" field in the information element 1100. The additional path list information element 1200 may include one or two additional path information elements, named "NR-AdditionalPath-r16." For a TDOA-based positioning procedure, the additional path fields may be for relative time difference measurements (i.e., RSTD measurements), and may be reported in an "nr-RelativeTimeDifference-r16" field. Alternatively, the additional path fields may be for the reception times of the additional paths, rather than relative time difference measurements based on the additional paths. Such a reception time field may be named "nr-ReceptionTime-r16" and may, like an "nr-RelativeTimeDifference-r16" field, be reported with a resolution chosen from "k0" to "k5."

In addition to the relative time difference measurement field or the reception time field, an additional path information element ("NR-AdditionalPath-r16") may include a field (not shown) indicating that the measured path is one of multiple hypothesis of the LOS delay, or a multipath, or both. The additional path information element may also include a field (not shown) indicating the strength of the path. The additional path information element may also include a field (not shown) indicating whether the UE believes the path is a reflected path, a scattered path, a diffracted path, etc.

For UE-based and UE-assisted positioning procedures, consider a scenario in which a UE identifies a virtual anchor having a consistent location across multiple multipath component measurements. In an aspect, the UE can report an estimated location and uncertainty of the virtual anchor to the location server (the positioning entity for UE-assisted positioning). The positioning entity (the UE or location server) will now have one extra equation for estimating the location of the UE (by using the virtual anchor as an anchor point). The positioning entity can keep this information in a database, along with similar information from other UEs (referred to as "crowdsourcing'), and use it to improve positioning accuracy for future positioning procedures with other UEs. For example, referring to FIG. 7, if the location of the virtual anchor 706 is determined based on a positioning procedure with UE3, that location can be used as an anchor for positioning procedures with UE1 and UE2. That is, the positioning entity can use the location of the virtual anchor 706 and the ToFs of the NLOS paths between the physical TRP and UE1 and UE2 in the position calculations for those UEs.

In an aspect, for UE-based positioning procedures, the estimated location of a virtual anchor can be signaled to the UE in assistance data. The assistance data may also include an uncertainty of the estimated location of the virtual anchor. The UE can then determine whether it will use this additional information for improving UE-based positioning accuracy. That is, the UE can determine whether it will use the virtual anchor as an anchor for the positioning procedure.

FIG. 13 illustrates an assistance data information element 1300 that includes the estimated location of a virtual anchor and an associated uncertainty, according to aspects of the disclosure. In the example of FIG. 13, the estimated location of the virtual anchor is provided in a "virtual-trp-location" field that points to a "RelativeLocation-r16" information element. The "RelativeLocation-r16" information element would include the coordinates of the virtual anchor. The associated uncertainty is provided in a "virtual-trp-uncertainty" field that points to a "LocationUncertaintyReport" information element.

The various information elements illustrated in FIGS. 11 to 13 may be LTE positioning protocol (LPP) information elements exchanged between a UE and a location server (e.g., LMF 270) or RRC information elements exchanged between a UE and a base station (where the positioning entity is located at the UE's serving base station).

Figure 14:
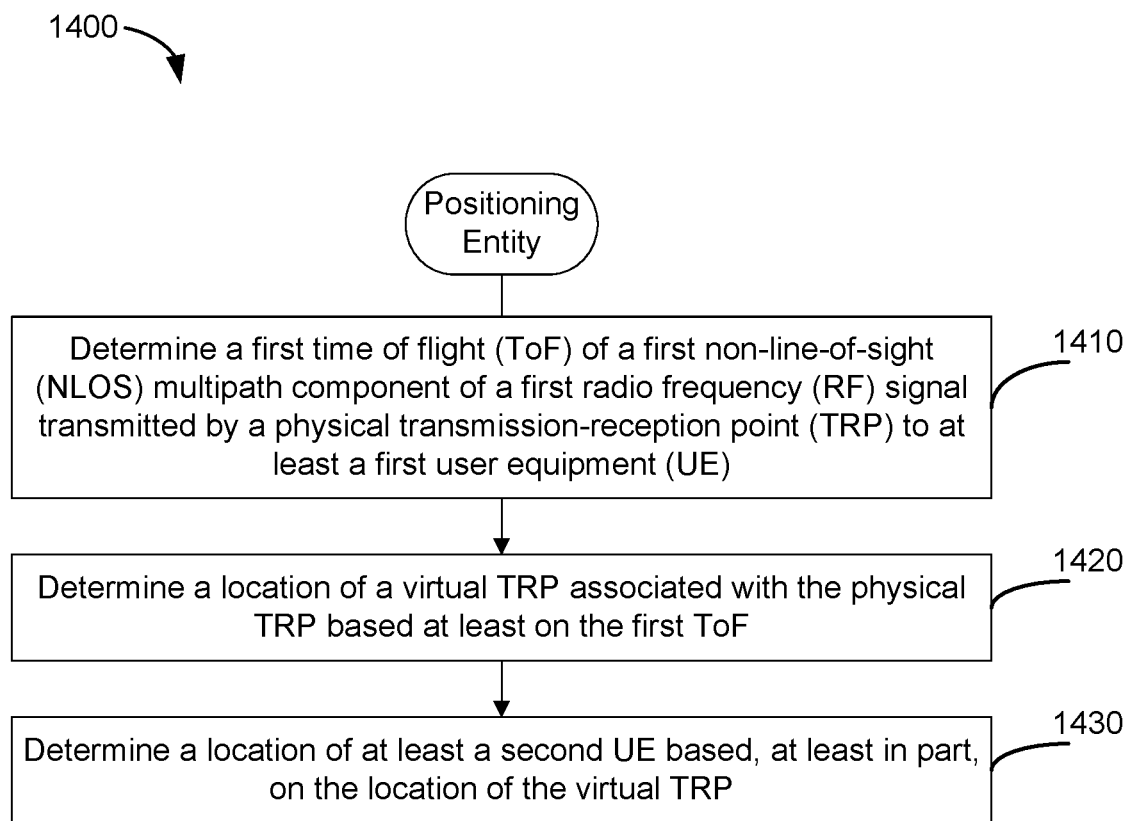
FIGS. 14 to 17 illustrate example methods of positioning, according to aspects of the disclosure.

FIG. 14 illustrates an example method 1400 of positioning, according to aspects of the disclosure. In an aspect, method 1400 may be performed by a positioning (e.g., a location server, a serving base station, any of the UE's described herein, etc.).

At 1410, the positioning entity determines a first ToF of a first NLOS multipath component of a first RF signal transmitted by a physical TRP (e.g., a TRP of any of the base stations described herein) to at least a first UE (e.g., any of the UEs described herein). In an aspect, where the positioning entity is a UE, operation 1410 may be performed by the one or more WWAN transceivers 310, the one or more processors 332, memory 340, and/or positioning component 342, any or all of which may be considered means for performing this operation. In an aspect, where the positioning entity is a base station, operation 1410 may be performed by the one or more WWAN transceivers 350, the one or more network transceivers 380, the one or more processors 384, memory 386, or positioning component 388, any or all of which may be considered means for performing this operation. In an aspect, where the positioning entity is a location server, operation 1410 may be performed by the one or more network transceivers 390, the one or more processors 394, memory 396, or positioning component 398, any or all of which may be considered means for performing this operation.

At 1420, the positioning entity determines a location of a virtual TRP (e.g., virtual anchor 706, 806, 1006) associated with the physical TRP based at least on the first ToF. In an aspect, where the positioning entity is a UE, operation 1420 may be performed by the one or more WWAN transceivers 310, the one or more processors 332, memory 340, and/or positioning component 342, any or all of which may be considered means for performing this operation. In an aspect, where the positioning entity is a base station, operation 1420 may be performed by the one or more WWAN transceivers 350, the one or more network transceivers 380, the one or more processors 384, memory 386, or positioning component 388, any or all of which may be considered means for performing this operation. In an aspect, where the positioning entity is a location server, operation 1420 may be performed by the one or more network transceivers 390, the one or more processors 394, memory 396, or positioning component 398, any or all of which may be considered means for performing this operation.

At 1430, the positioning entity determines a location of at least a second UE (e.g., the first UE or a different UE) based, at least in part, on the location of the virtual TRP. In an aspect, where the positioning entity is a UE, operation 1430 may be performed by the one or more WWAN transceivers 310, the one or more processors 332, memory 340, and/or positioning component 342, any or all of which may be considered means for performing this operation. In an aspect, where the positioning entity is a base station, operation 1430 may be performed by the one or more WWAN transceivers 350, the one or more network transceivers 380, the one or more processors 384, memory 386, or positioning component 388, any or all of which may be considered means for performing this operation. In an aspect, where the positioning entity is a location server, operation 1430 may be performed by the one or more network transceivers 390, the one or more processors 394, memory 396, or positioning component 398, any or all of which may be considered means for performing this operation.

Figure 15:
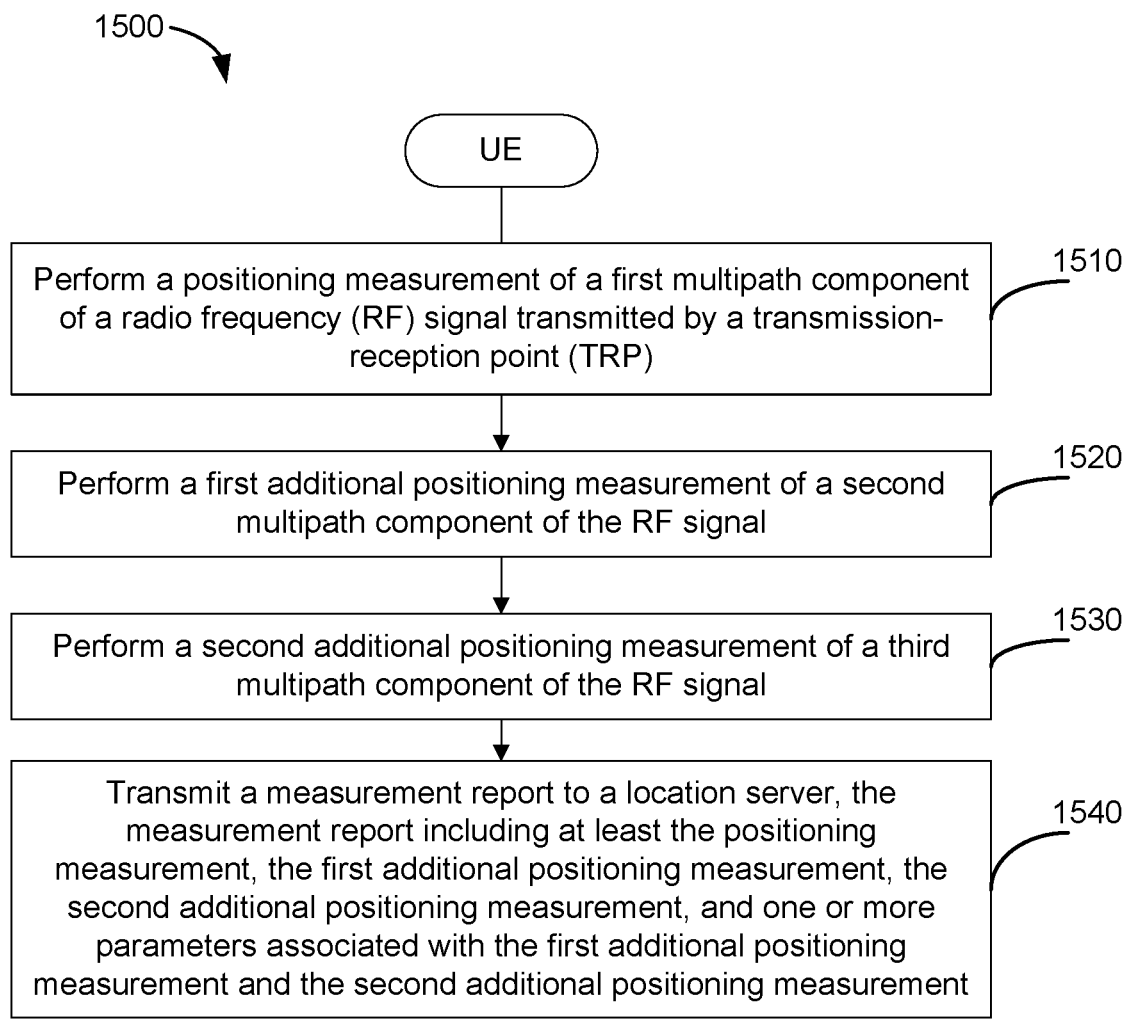

FIG. 15 illustrates an example method 1500 of wireless positioning, according to aspects of the disclosure. In an aspect, method 1500 may be performed by a UE (e.g., any of the UE's described herein, etc.).

At 1510, the UE performs a positioning measurement of a first multipath component of an RF signal transmitted by a TRP (e.g., a TRP of any of the base stations described herein). In an aspect, operation 1510 may be performed by the one or more WWAN transceivers 310, the one or more processors 332, memory 340, and/or positioning component 342, any or all of which may be considered means for performing this operation.

At 1520, the UE performs a first additional positioning measurement of a second multipath component of the RF signal. In an aspect, operation 1520 may be performed by the one or more WWAN transceivers 310, the one or more processors 332, memory 340, and/or positioning component 342, any or all of which may be considered means for performing this operation.

At 1530, the UE performs a second additional positioning measurement of a third multipath component of the RF signal. In an aspect, operation 1530 may be performed by the one or more WWAN transceivers 310, the one or more processors 332, memory 340, and/or positioning component 342, any or all of which may be considered means for performing this operation.

At 1540, the UE transmits a measurement report to a location server, the measurement report including at least the positioning measurement, the first additional positioning measurement, the second additional positioning measurement, and one or more parameters associated with the first additional positioning measurement and the second additional positioning measurement. In an aspect, operation 1540 may be performed by the one or more WWAN transceivers 310, the one or more processors 332, memory 340, and/or positioning component 342, any or all of which may be considered means for performing this operation.

Figure 16:
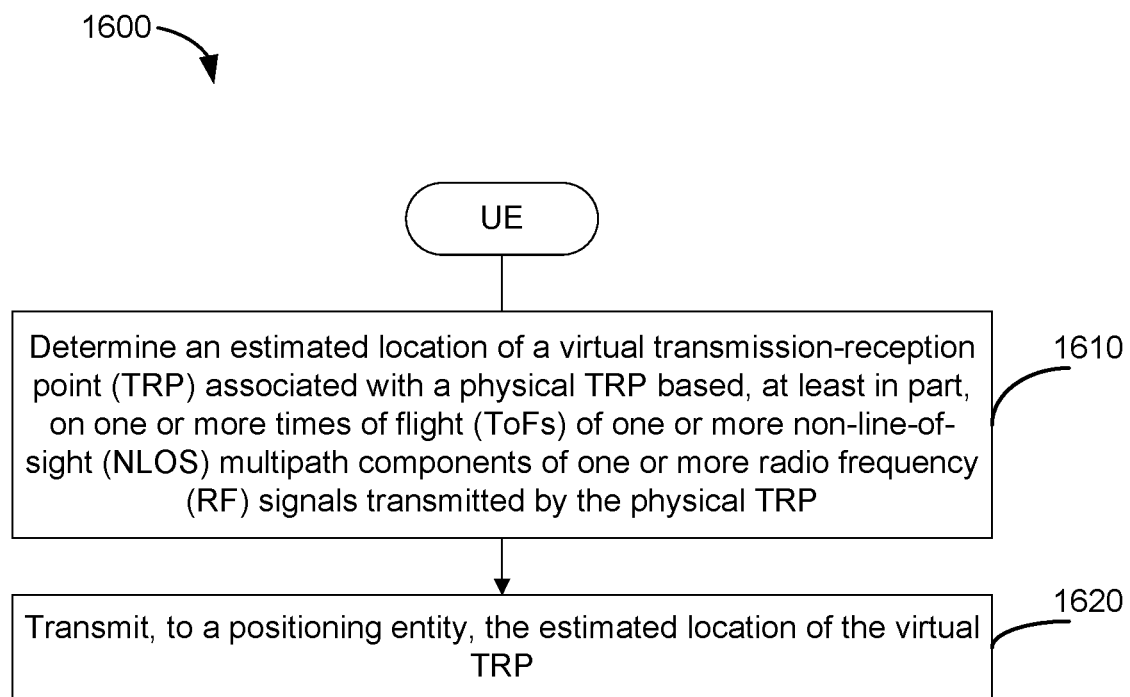

FIG. 16 illustrates an example method 1600 of wireless positioning, according to aspects of the disclosure. In an aspect, method 1600 may be performed by a UE (e.g., any of the UE's described herein, etc.).

At 1610, the UE determines an estimated location of a virtual TRP associated with a physical TRP (e.g., a TRP of any of the base stations described herein) based, at least in part, on one or more ToFs of one or more NLOS multipath components of one or more RF signals transmitted by the physical TRP. In an aspect, operation 1610 may be performed by the one or more WWAN transceivers 310, the one or more processors 332, memory 340, and/or positioning component 342, any or all of which may be considered means for performing this operation.

At 1620, the UE transmits, to a positioning entity (e.g., a location server or the serving base station), the estimated location of the virtual TRP. In an aspect, operation 1620 may be performed by the one or more WWAN transceivers 310, the one or more processors 332, memory 340, and/or positioning component 342, any or all of which may be considered means for performing this operation.

Figure 17:
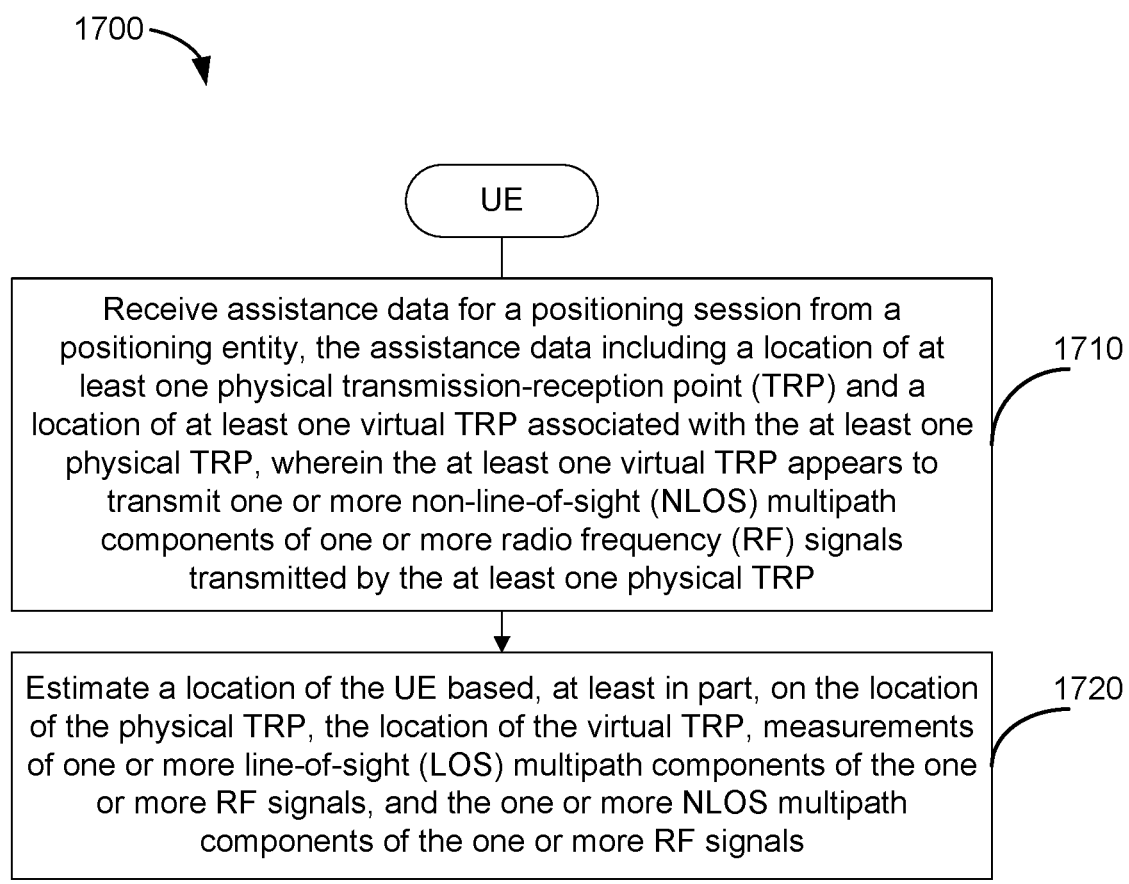

FIG. 17 illustrates an example method 1700 of wireless positioning, according to aspects of the disclosure. In an aspect, method 1700 may be performed by a UE (e.g., any of the UE's described herein, etc.).

At 1710, the UE receives assistance data for a positioning session from a positioning entity (e.g., a location server or the UE's serving base station), the assistance data including a location of at least one physical TRP (e.g., a TRP of any of the base stations described herein) and a location of at least one virtual TRP associated with the at least one physical TRP, wherein the at least one virtual TRP appears to transmit one or more NLOS multipath components of one or more RF signals transmitted by the at least one physical TRP. In an aspect, operation 1710 may be performed by the one or more WWAN transceivers 310, the one or more processors 332, memory 340, and/or positioning component 342, any or all of which may be considered means for performing this operation.

At 1720, the UE estimates a location of the UE based, at least in part, on the location of the physical TRP, the location of the virtual TRP, measurements of one or more LOS multipath components of the one or more RF signals, and the one or more NLOS multipath components of the one or more RF signals. In an aspect, operation 1720 may be performed by the one or more WWAN transceivers 310, the one or more processors 332, memory 340, and/or positioning component 342, any or all of which may be considered means for performing this operation.

As will be appreciated, a technical advantage of the methods 1400 to 1700 is the ability to use virtual TRPs as additional anchor points for positioning.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of positioning performed by a positioning entity, comprising: determining a first time of flight (ToF) of a first non-line-of-sight (NLOS) multipath component of a first radio frequency (RF) signal transmitted by a physical transmission-reception point (TRP) to at least a first user equipment (UE); determining a location of a virtual TRP associated with the physical TRP based at least on the first ToF; and determining a location of at least a second UE based, at least in part, on the location of the virtual TRP.

Clause 2. The method of clause 1, further comprising: receiving, from the first UE, a reception time of the first NLOS multipath component at the first UE, wherein the first ToF is determined based on a transmission time of the first RF signal from the physical TRP and the reception time of the first RF signal at the first UE.

Clause 3. The method of any of clauses 1 to 2, further comprising: receiving, from the physical TRP, a transmission time of the first RF signal from the physical TRP, wherein the first ToF is determined based on the transmission time of the first RF signal and a reception time of the first RF signal at the first UE.

Clause 4. The method of any of clauses 1 to 3, further comprising: determining a second ToF of a second NLOS multipath component of a second RF signal transmitted by the physical TRP to at least the first UE, wherein the location of the virtual TRP is further based on the second ToF.

Clause 5. The method of clause 4, wherein: the first NLOS multipath component is measured at a first location of the first UE, and the second NLOS multipath component is measured at a second location of the first UE different from the first location.

Clause 6. The method of clause 5, wherein the location of the virtual TRP is determined to be at an intersection of a first circle centered at the first UE and having a radius of a first distance between the first UE and the virtual TRP and a second circle centered at the first UE and having a radius of a second distance between the first UE and the virtual TRP.

Clause 7. The method of clause 6, wherein: the first distance is based on the first ToF, and the second distance is based on the second ToF.

Clause 8. The method of any of clauses 1 to 7, further comprising: determining an angle-of-arrival (AoA) of the first NLOS multipath component, wherein the location of the virtual TRP is further based on the AoA of the first NLOS multipath component.

Clause 9. The method of any of clauses 1 to 8, further comprising: determining a plurality of ToFs of a plurality of NLOS multipath components of a plurality of RF signals transmitted by the physical TRP to at least the first UE, the plurality of ToFs including the first ToF, the plurality of NLOS multipath components including the first NLOS multipath component, and the plurality of RF signals including the first RF signal, wherein the plurality of NLOS multipath components are measured at a plurality of locations of the first UE, wherein determining the location of the virtual TRP comprises: determining a plurality of locations of the virtual TRP based at least on the plurality of ToFs; discarding locations of the plurality of locations of the virtual TRP that are not consistent with remaining locations of the plurality of locations of the virtual TRP; and determining the location of the virtual TRP as a location corresponding to the remaining locations of the plurality of locations of the virtual TRP.

Clause 10. The method of clause 9, wherein the locations of the plurality of locations of the virtual TRP that are not consistent with remaining locations of the plurality of locations of the virtual TRP are discarded after a threshold number of locations of the virtual TRP have been determined.

Clause 11. The method of any of clauses 9 to 10, wherein the location of the virtual TRP is determined as the location corresponding to the remaining locations of the plurality of locations of the virtual TRP based on there being a threshold number of the remaining locations of the plurality of locations of the virtual TRP.

Clause 12. The method of any of clauses 1 to 11, wherein the first UE and the second UE are the same UE.

Clause 13. The method of any of clauses 1 to 11, wherein the first UE and the second UE are different UEs.

Clause 14. The method of any of clauses 1 to 13, further comprising: determining a plurality of ToFs of a plurality of NLOS multipath components of a plurality of RF signals transmitted by the physical TRP to a plurality of UEs, the plurality of ToFs including the first ToF, the plurality of NLOS multipath components including the first NLOS multipath component, the plurality of RF signals including the first RF signal, and the plurality of UEs including the first UE, wherein determining the location of the virtual TRP comprises determining the location of the virtual TRP based at least on the plurality of ToFs.

Clause 15. The method of any of clauses 1 to 14, wherein the positioning entity is a location server.

Clause 16. The method of any of clauses 1 to 14, wherein the positioning entity is the second UE.

Clause 17. An apparatus comprising a memory, at least one transceiver, and at least one processor communicatively coupled to the memory and the at least one transceiver, the at least one processor configured to perform a method in accordance with any of clauses 1 to 16.

Clause 18. An apparatus comprising means for performing a method in accordance with any of clauses 1 to 16.

Clause 19. A computer-readable medium storing computer-executable instructions, the computer-executable instructions comprising at least one instruction for causing an apparatus to perform a method in accordance with any of clauses 1 to 16.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of positioning performed by a positioning entity, comprising:
    determining a first time of flight (ToF) of a first non-line-of-sight (NLOS) multipath component of a first radio frequency (RF) signal transmitted by a physical transmission-reception point (TRP) to at least a first user equipment (UE);
    determining a location of a virtual TRP associated with the physical TRP based at least on the first ToF; and
    determining a location of at least a second UE based, at least in part, on the location of the virtual TRP.

2. The method of claim 1, further comprising:
    receiving, from the first UE, a reception time of the first NLOS multipath component at the first UE, wherein the first ToF is determined based on a transmission time of the first RF signal from the physical TRP and the reception time of the first RF signal at the first UE.

3. The method of claim 1, further comprising:
    receiving, from the physical TRP, a transmission time of the first RF signal from the physical TRP, wherein the first ToF is determined based on the transmission time of the first RF signal and a reception time of the first RF signal at the first UE.

4. The method of claim 1, further comprising:
    determining a second ToF of a second NLOS multipath component of a second RF signal transmitted by the physical TRP to at least the first UE, wherein the location of the virtual TRP is further based on the second ToF.

5. The method of claim 4, wherein:
    the first NLOS multipath component is measured at a first location of the first UE, and the second NLOS multipath component is measured at a second location of the first UE different from the first location.

6. The method of claim 5, wherein the location of the virtual TRP is determined to be at an intersection of a first circle centered at the first UE and having a radius of a first distance between the first UE and the virtual TRP and a second circle centered at the first UE and having a radius of a second distance between the first UE and the virtual TRP.

7. The method of claim 6, wherein:
the first distance is based on the first ToF, and
the second distance is based on the second ToF.

8. The method of claim 1, further comprising:
determining an angle-of-arrival (AoA) of the first NLOS multipath component, wherein the location of the virtual TRP is further based on the AoA of the first NLOS multipath component.

9. The method of claim 1, further comprising:
determining a plurality of ToFs of a plurality of NLOS multipath components of a plurality of RF signals transmitted by the physical TRP to at least the first UE, the plurality of ToFs including the first ToF, the plurality of NLOS multipath components including the first NLOS multipath component, and the plurality of RF signals including the first RF signal, wherein the plurality of NLOS multipath components are measured at a plurality of locations of the first UE,
wherein determining the location of the virtual TRP comprises:
determining a plurality of locations of the virtual TRP based at least on the plurality of ToFs;
discarding locations of the plurality of locations of the virtual TRP that are not consistent with remaining locations of the plurality of locations of the virtual TRP; and
determining the location of the virtual TRP as a location corresponding to the remaining locations of the plurality of locations of the virtual TRP.

10. The method of claim 9, wherein the locations of the plurality of locations of the virtual TRP that are not consistent with remaining locations of the plurality of locations of the virtual TRP are discarded after a threshold number of locations of the virtual TRP have been determined.

11. The method of claim 9, wherein the location of the virtual TRP is determined as the location corresponding to the remaining locations of the plurality of locations of the virtual TRP based on there being a threshold number of the remaining locations of the plurality of locations of the virtual TRP.

12. The method of claim 1, wherein the first UE and the second UE are the same UE.

13. The method of claim 1, wherein the first UE and the second UE are different UEs.

14. The method of claim 1, further comprising:
determining a plurality of ToFs of a plurality of NLOS multipath components of a plurality of RF signals transmitted by the physical TRP to a plurality of UEs, the plurality of ToFs including the first ToF, the plurality of NLOS multipath components including the first NLOS multipath component, the plurality of RF signals including the first RF signal, and the plurality of UEs including the first UE,
wherein determining the location of the virtual TRP comprises determining the location of the virtual TRP based at least on the plurality of ToFs.

15. The method of claim 1, wherein the positioning entity is a location server.

16. The method of claim 1, wherein the positioning entity is the second UE.

17. A positioning entity, comprising:
a memory;
at least one transceiver; and
at least one processor communicatively coupled to the memory and the at least one transceiver, the at least one processor configured to:
determine a first time of flight (ToF) of a first non-line-of-sight (NLOS) multipath component of a first radio frequency (RF) signal transmitted by a physical transmission-reception point (TRP) to at least a first user equipment (UE);
determine a location of a virtual TRP associated with the physical TRP based at least on the first ToF; and
determine a location of at least a second UE based, at least in part, on the location of the virtual TRP.

18. The positioning entity of claim 17, wherein the at least one processor is further configured to:
receive, via the at least one transceiver, from the first UE, a reception time of the first NLOS multipath component at the first UE, wherein the first ToF is determined based on a transmission time of the first RF signal from the physical TRP and the reception time of the first RF signal at the first UE.

19. The positioning entity of claim 17, wherein the at least one processor is further configured to:
receive, via the at least one transceiver, from the physical TRP, a transmission time of the first RF signal from the physical TRP, wherein the first ToF is determined based on the transmission time of the first RF signal and a reception time of the first RF signal at the first UE.

20. The positioning entity of claim 17, wherein the at least one processor is further configured to:
determine a second ToF of a second NLOS multipath component of a second RF signal transmitted by the physical TRP to at least the first UE, wherein the location of the virtual TRP is further based on the second ToF.

21. The positioning entity of claim 20, wherein:
the first NLOS multipath component is measured at a first location of the first UE, and
the second NLOS multipath component is measured at a second location of the first UE different from the first location.

22. The positioning entity of claim 21, wherein the location of the virtual TRP is determined to be at an intersection of a first circle centered at the first UE and having a radius of a first distance between the first UE and the virtual TRP and a second circle centered at the first UE and having a radius of a second distance between the first UE and the virtual TRP.

23. The positioning entity of claim 22, wherein:
the first distance is based on the first ToF, and
the second distance is based on the second ToF.

24. The positioning entity of claim 17, wherein the at least one processor is further configured to:
determine an angle-of-arrival (AoA) of the first NLOS multipath component, wherein the location of the virtual TRP is further based on the AoA of the first NLOS multipath component.

25. The positioning entity of claim 17, wherein the at least one processor is further configured to:
determine a plurality of ToFs of a plurality of NLOS multipath components of a plurality of RF signals transmitted by the physical TRP to at least the first UE, the plurality of ToFs including the first ToF, the plurality of NLOS multipath components including the first NLOS multipath component, and the plurality of RF signals including the first RF signal, wherein the plurality of NLOS multipath components are measured at a plurality of locations of the first UE, wherein the at least one processor configured to determine the location of the virtual TRP comprises the at least one processor configured to:

determine a plurality of locations of the virtual TRP based at least on the plurality of ToFs;

discard locations of the plurality of locations of the virtual TRP that are not consistent with remaining locations of the plurality of locations of the virtual TRP; and determine the location of the virtual TRP as a location corresponding to the remaining locations of the plurality of locations of the virtual TRP.

26. The positioning entity of claim 25, wherein the locations of the plurality of locations of the virtual TRP that are not consistent with remaining locations of the plurality of locations of the virtual TRP are discarded after a threshold number of locations of the virtual TRP have been determined.

27. The positioning entity of claim 25, wherein the location of the virtual TRP is determined as the location corresponding to the remaining locations of the plurality of locations of the virtual TRP based on there being a threshold number of the remaining locations of the plurality of locations of the virtual TRP.

28. The positioning entity of claim 17, wherein the at least one processor is further configured to:

determine a plurality of ToFs of a plurality of NLOS multipath components of a plurality of RF signals transmitted by the physical TRP to a plurality of UEs, the plurality of ToFs including the first ToF, the plurality of NLOS multipath components including the first NLOS multipath component, the plurality of RF signals including the first RF signal, and the plurality of UEs including the first UE, wherein the at least one processor configured to determine the location of the virtual TRP comprises the at least one processor configured to determine the location of the virtual TRP based at least on the plurality of ToFs.

29. A positioning entity, comprising:

means for determining a first time of flight (ToF) of a first non-line-of-sight (NLOS) multipath component of a first radio frequency (RF) signal transmitted by a physical transmission-reception point (TRP) to at least a first user equipment (UE);

means for determining a location of a virtual TRP associated with the physical TRP based at least on the first ToF; and means for determining a location of at least a second UE based, at least in part, on the location of the virtual TRP.

30. A non-transitory computer-readable medium storing computer-executable instructions that, when executed by a positioning entity, cause the positioning entity to:

determine a first time of flight (ToF) of a first non-line-of-sight (NLOS) multipath component of a first radio frequency (RF) signal transmitted by a physical transmission-reception point (TRP) to at least a first user equipment (UE);

determine a location of a virtual TRP associated with the physical TRP based at least on the first ToF; and determine a location of at least a second UE based, at least in part, on the location of the virtual TRP.

\* \* \* \* \*